Patented July 24, 1928.

1,678,108

UNITED STATES PATENT OFFICE.

LEONHARD DEUTSCH AND ISAK THORN, OF VIENNA, AUSTRIA, ASSIGNORS TO THE SELDEN COMPANY, OF PITTSBURGH, PENNSYLVANIA, A CORPORATION OF DELAWARE.

PROCESS OF HARDENING THE PRODUCTS OF CONDENSATION OF PHENOLS AND ALDEHYDES.

No Drawing. Application filed September 15, 1923, Serial No. 662,999, and in Yugoslavia September 28, 1922.

In order to transform the products of condensation from phenols and aldehydes, from the viscous state into the solid and usually insoluble and infusible state, they are poured into box-shaped or tubular receptacles of sheet metal, glass or the like which are closed at the bottom and thereafter they are continuously heated at atmospheric or superatmospheric pressure. After the hardening-process is finished the cast articles adhere more or less fast to the walls of the receptacle, depending on how often the receptacle has been used, so that finally the casting can be removed from the receptacle by force only, which frequently results in breakage or deformation or in an injury to the cast article.

This drawback, which results in a considerable loss of material and time, may be removed by employing a mold which is not closed at the bottom and through which may be caused to flow a liquid which does not mix with the mass to be hardened, does not affect its surface and is of a greater specific gravity than the same. The liquid also acts as a heat-conductor and thus facilitates the maintaining of constant temperature and therefore considerably reduces the danger of the formation of bubbles owing to superheating as well as the danger of internal tensions (cracks, deformations) in consequence of local differences in temperature.

Salt solution can be used for this purpose, also an easily fusible metal-alloy may be employed, such as for instance wood metal or rose metal.

In order to render possible a uniform transfer of heat from all sides it is advisable to cover the mass being molded, with an indifferent (inert) liquid of a lower specific gravity than the mass, for instance with oil. Of course oils are used which are inert to the reacting materials. In place of such a liquid also suitable solid matters may be employed whose fusing-point is below the temperature of hardening, such as for instance aliphatic or aromatic hydrocarbons (paraffin, naphthalene or the like). The heating is performed in the usual manner, and the employed heat-transfer material and covering material may be retained in the molten condition. During the hardening, the covering mass may be allowed to solidify, in which case the separation from the reaction product will be far easier. As the mold is open at both top and bottom, the hardened cast-articles may be removed without difficulty.

We claim:

1. A process of hardening fusible condensation products of phenols and aldehydes, which comprises carrying out the hardening in a mold, which laterally supports the material to be molded, but which is open at least at the bottom, and maintaining a liquid of higher specific gravity than the material to be molded below and in contact with the bottom surface thereof.

2. A process of hardening fusible condensation products from phenols and aldehydes, which consists in condensing the products while in a mold which laterally supports them, but which is open top and bottom, the hardening taking place in the presence of a relatively inert liquid of higher specific gravity than the material to be molded and in contact with the bottom surface thereof, and in the presence of a relatively inert liquid of lower specific gravity than the material to be molded, and in contact with the top surface thereof.

3. A method according to claim 1, in which the liquid is circulated and used as a heat transfer medium to supply at least part of the heat required for hardening the condensation products.

4. A method according to claim 2, in which the liquid is circulated and used as a heat transfer medium to supply at least part of the heat required for hardening the condensation products.

5. A process according to claim 1, in which the liquid is a metallic substance having a melting point substantially below the temperatures required for hardening.

6. A method according to claim 2, in which the liquid of higher specific gravity is a metallic substance having a melting point substantially below the temperatures required for hardening the condensation product.

In testimony whereof we affix our signatures.

DR. LEONHARD DEUTSCH.
ING. ISAK THORN.